United States Patent
Larkin et al.

(10) Patent No.: US 9,826,347 B2
(45) Date of Patent: Nov. 21, 2017

(54) METHODS AND SYSTEMS FOR CONTENT CONSUMPTION

(71) Applicant: COMCAST CABLE COMMUNICATIONS, LLC, Philadelphia, PA (US)

(72) Inventors: Andrew Larkin, Philadelphia, PA (US); Franklyn Athias, Cherry Hill, NJ (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 14/151,467

(22) Filed: Jan. 9, 2014

(65) Prior Publication Data

US 2015/0195675 A1 Jul. 9, 2015

(51) Int. Cl.
| | | |
|---|---|---|
| H04W 24/00 | (2009.01) | |
| H04W 4/02 | (2009.01) | |
| H04L 29/08 | (2006.01) | |
| H04W 4/00 | (2009.01) | |

(52) U.S. Cl.
CPC ............... *H04W 4/02* (2013.01); *H04L 67/06* (2013.01); *H04L 67/148* (2013.01); *H04L 67/18* (2013.01); *H04W 4/023* (2013.01); *H04W 4/008* (2013.01)

(58) Field of Classification Search
CPC ......... H04N 21/47202; H04N 21/2223; H04N 21/41407; H04N 21/4788; H04N 21/6125; H04N 21/8113; H04N 21/44008; H04N 21/8549; H04N 21/440236; H04N 21/00; H04N 21/4331; H04N 21/4405; H04N 21/482

USPC ........................................................ 455/456.3
See application file for complete search history.

(56) References Cited

U.S. PATENT DOCUMENTS

| | | |
|---|---|---|
| 2006/0046709 A1 | 3/2006 | Krumm et al. |
| 2008/0039058 A1 | 2/2008 | Ray |
| 2009/0001173 A1* | 1/2009 | Sevier et al. ............ 235/462.41 |
| 2010/0332565 A1* | 12/2010 | Al-Shaykh ........ G06F 17/30905 707/912 |
| 2013/0111039 A1 | 5/2013 | Gomes |
| 2013/0157568 A1 | 6/2013 | Jain et al. |

(Continued)

FOREIGN PATENT DOCUMENTS

| | | |
|---|---|---|
| CA | 2877360 | 1/2015 |
| EP | 2387202 A1 | 11/2011 |
| EP | 15150686.2 | 1/2015 |

OTHER PUBLICATIONS

Search Report issued by the European Patent Office for Application No. EP 15150686.2, which was filed Jan. 9, 2015 (Applicant—Comcast Cable Communications//1st Named Inventor—Larkin) (7 pages).

*Primary Examiner* — Kwasi Karikari
(74) *Attorney, Agent, or Firm* — Ballard Spahr LLP

(57) ABSTRACT

Methods and systems for content consumption are described. One method comprises providing content to a first device, receiving a command to provide the content to a second device, determining the second device from a plurality of devices based on a proximity metric, and providing the content to the second device. The command can indicate a switch point, specify one or more non-transferable devices and block the direction of content transfer between certain devices.

20 Claims, 9 Drawing Sheets

(56) References Cited

U.S. PATENT DOCUMENTS

| | | | | |
|---|---|---|---|---|
| 2013/0166399 A1* | 6/2013 | Awad | ............... | G06Q 30/0207 705/16 |
| 2013/0311935 A1* | 11/2013 | Setlur | ............... | G06F 1/1694 715/781 |
| 2014/0108929 A1* | 4/2014 | Garmark et al. | ............... | 715/716 |

* cited by examiner

METHODS AND SYSTEMS FOR CONTENT CONSUMPTION

BACKGROUND

Current network technology enables content consumption through different user devices. Content can be transferred from one device to another, for example, from a television to a desktop computer or from a mobile phone to a laptop, when the devices are within the same network. Users can direct the transfer of content between devices according to a transfer protocol. The transfer protocol, however, requires the user to specify where the content will be displayed. These and other shortcomings are identified and addressed by the present disclosure.

SUMMARY

It is to be understood that both the following general description and the following detailed description are exemplary and explanatory only and are not restrictive, as claimed. Provided are methods and systems for content consumption. An example method for content consumption can comprise providing content to a first device, receiving a command to provide the content to a second device, determining the second device from a plurality of devices based on a proximity metric, and providing the content to the second device.

Another example method for content consumption can comprise receiving a request to switch content from being delivered to a first device to being delivered to a second device, receiving a switch point, determining the second device from a plurality of devices based on a proximity metric, and providing a command to provide content to the second device at the switch point.

An example apparatus for content consumption can comprise a memory and a processor. In an aspect, the processor can be configured to receive a request to switch content from being delivered to a first device to being delivered to a second device, receive a switch point, determine the second device from a plurality of devices based on a proximity metric, and provide a command to provide content to the second device at the switch point. In an aspect, the memory can be configured to store proximity metrics, such as RSSI value or GPS coordinates of the first device and the plurality of devices.

Additional advantages will be set forth in part in the description that follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
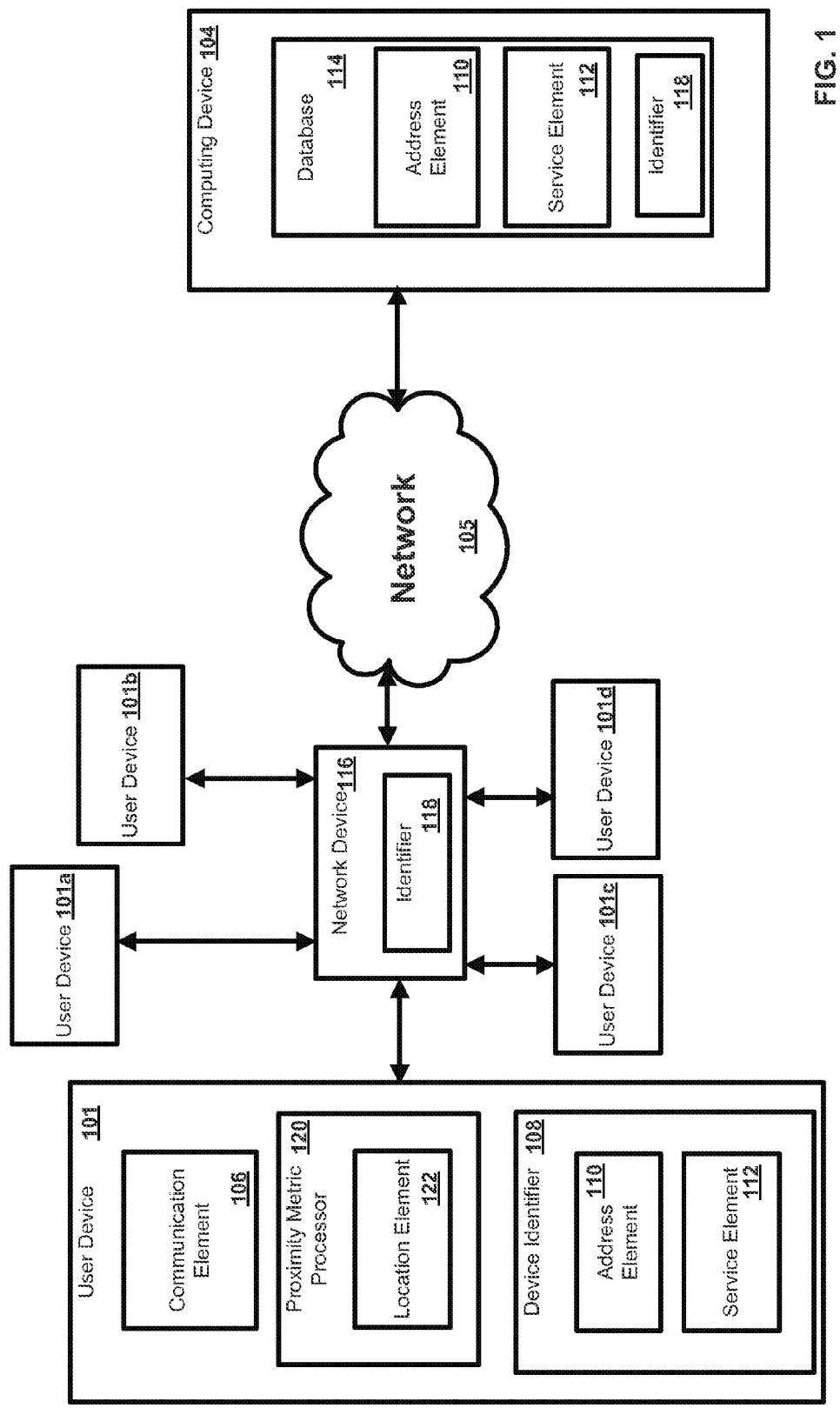
FIG. 1 is a block diagram of an exemplary system for content consumption.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, the methods and systems can utilize digital audio/video compression, such as MPEG or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

In one aspect of the disclosure, a system can be configured to provide services, such as network-related services, to a user device. The present disclosure is relevant to systems and methods for providing services to a device. For example, content delivery services to a user device, such as a computer, tablet, mobile device, communications terminal, and the like. In an aspect, one or more network devices can be configured to provide various services to one or more devices, such as devices located at or near a premise. In another aspect, the network devices can be configured to recognize an authoritative device for the premises and/or a particular service or services available at the premises. As an example, an authoritative device can be configured to govern or enable connectivity to a network, such as the Internet or other remote resources, to provide address and/or configuration services like DHCP, and/or to provide naming or service discovery services for a premises, or a combination thereof.

The present disclosure relates to systems and methods for the transfer of content consumption from a first/original device to a second/target device within the same network based on a proximity metric. In an aspect, a request can be received to switch content from being delivered to a first device to being delivered to a second device. The selection of the second device can be achieved by comparing proximity metrics of the first device and a plurality of other devices visible to the same network. The device with the least difference in proximity metric can be selected as a second device (target device). Once the second device is selected, content can be provided to the second device. In an aspect, specific devices can be excluded from the selection process.

FIG. 1 illustrates various aspects of an exemplary environment in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

FIG. 1 is a block diagram of an exemplary system for content consumption. In an aspect, the system can comprise a plurality of user devices 101, 101a, 101b, 101c and 101d in communication with a computing device 104, for example, a server. The computing device 104 can be disposed locally or remotely relative to user devices 101, 101a, 101b, 101c and 101d. User devices 101, 101a, 101b, 101c and 101d and the computing device 104 can be in communication via a private and/or a public network 105, for example, a local area network or the Internet. Other possible modes of communication between devices are wired and wireless telecommunication channels. For example, user devices 101, 101a, 101b, 101c and 101d can be connected to a wired and/or wireless network using Wi-Fi, Bluetooth or any desired method or standard.

In an aspect, user devices 101, 101a, 101b, 101c and 101d can be any device capable of communicating with the computing device 104. In an aspect, user devices 101, 101a, 101b, 101c and 101d can be different types of devices. As an example, user devices 101, 101a, 101b, 101c and 101d can be electronic devices, such as desktop computers, smart phones, laptops, tablets, set top boxes, and the like. In an aspect, the user devices 101, 101a, 101b, 101c and 101d can comprise a respective communication element 106 that provides a user interface for interaction with the respective user device 101, 101a, 101b, 101c and 101d and/or the computing device 104. Communication element 106 can be any interface for presenting and/or receiving information to/from the user. Other configurations of software, hardware, and/or interfaces can be used to enable communication between the user, the computing device 104, and one or more of the user devices 101, 101a, 101b, 101c and 101d. The communication element 106 can be used to perform a variety of operations, for example, request or query various files from a local source and/or a remote source. In a further example, the communication element 106 can be used to transmit data to a local or remote device, for example, the computing device 104.

In an aspect, the user devices 101, 101a, 101b, 101c and 101d can comprise a respective proximity metric processor 120. The proximity metric processor 120 can be configured to receive a request to switch content from being delivered to a first device to being delivered to a second device, receive a switch point, determine the second device from a plurality of devices based on a proximity metric, and provide a command to provide content to the second device at the switch point. As an example, the proximity metric processor 120 can collect and process proximity metric information from user devices 101, 101a, 101b, 101c and 101d to determine the second user device.

The proximity metric processor 120 can receive and compare location information. In an aspect, the proximity metric processor 120 can comprise a location element 122, i.e., a device and/or logic that can receive and process location information. The location information can be coordinates, such as latitude, longitude, altitude and the like from a satellite based positioning system, for example, a global positioning system (GPS). In another aspect, the location information can be signal strength indicator (RSSI) values.

The user devices 101, 101a, 101b, 101c and 101d can be associated with a user identifier or device identifier 108. As an example, the device identifier 108 can be any identifier, token, character, string, or the like, for differentiating one user or user device (e.g., user devices 101, 101a, 101b, 101c and 101d) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user devices, a state of the user devices, a locator, and/or a label or classifier. Other information can be represented by the device identifier 108. By way of example, the device identifier 108 can be used to address content to a specific user device. As an example, when determining a second user device, the content provider can obtain the device identifier 108 associated with the second user device and thereby provide the content to the second user device.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied on to establish a communication session between the user devices 101, 101a, 101b, 101c and 101d and the computing device 104 or other devices and/or networks. As a further example, the address element 110 can be used as an identifier or locator of the user devices 101, 101a, 101b, 101c and 101d. In an aspect, the address element 110 can be persistent for a particular network. For example, a content provider can obtain the address element 110 associated with a specific user device and thereby deliver content to the specific device at its location.

The service element 112 can comprise an identification of a service provider associated with the user devices and/or with the class of user devices. The class of the user devices can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow, such as communication services, to the user devices 101, 101a, 101b, 101c and 101d. As a further example, the service element 112 can comprise information relating to a preferred service provider for one or more particular services relating to the user devices. In an aspect, the address element 110 can be used to identify or retrieve data from the service element 112, or vise versa. As a further example, one or more of the address element 110 and the service element 112 can be stored remotely from the user devices and retrieved by one or more devices, such as the user devices 101, 101a, 101b, 101c and 101d and the computing device 104. Other information can be represented by the service element 112.

In an aspect, the computing device 104 can be a server for communicating with the user devices 101, 101a, 101b, 101c and 101d. As an example, the computing device 104 can communicate with the user devices 101, 101a, 101b. 101c and 101d for providing data and/or services. As an example, the computing device 104 can provide services, such as network (e.g., Internet) connectivity, network printing, media management (e.g., media server), content services, streaming services, broadband services, or other network-related services. In an aspect, the computing device 104 can allow the user devices 101, 101a, 101b, 101c and 101d to interact with remote resources, such as data, devices, and files. As an example, the computing device can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

In an aspect, the computing device 104 can manage the communication between the user devices 101, 101a, 101b, 101c and 101d and a database 114 for sending and receiving data therebetween. As an example, the database 114 can store a plurality of files (e.g., web pages), user identifiers or records, or other information. As a further example, the user devices 101, 101a, 101b, 101c and 101d can request and/or retrieve a file from the database 114. In an aspect, the database 114 can store information relating to the user devices 101, 101a, 101b, 101c and 101d, such as the address element 110 and/or the service element 112. As an example, the computing device 104 can obtain the device identifier 108 from the user devices 101, 101a, 101b, 101c and 101d and retrieve information from the database 114, such as the address element 110 and/or the service elements 112. As a further example, the computing device 104 can obtain the address element 110 from the user devices 101, 101a, 101b, 101c and 101d and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

One or more network devices 116 can be in communication with a network, such as network 105. As an example, one or more of the network devices 116 can facilitate the connection of a device, such as user devices 101, 101a, 101b, 101c and 101d, to the network 105. As a further example, one or more of the network devices 116 can be configured as a wireless access point (WAP). In an aspect, one or more network devices 116 can be configured to allow one or more wireless devices to connect to a wired and/or wireless network using Wi-Fi, Bluetooth or any desired method or standard.

The network device 116 can be configured as a local area network (LAN). As an example, the network device 116 can comprise a dual band wireless access point. In an aspect, network device 116 can serve as a wireless base station, a plurality of user devices 101, 101a, 101b, 101c and 101d can be routed through network device 116 and visible by the network device 116. As an example, the network device 116 can be configured with a service set identifier (SSID) (e.g., associated with a user network or private network) to function as a local network for a particular user or users. As an example, the network device 116 can be configured to communicate with a content provider (e.g. the computing device 104), thereby delivering content to one or more user devices, for example, 101, 101a, 101b, 101c and 101d. As another example, the network device 116 can be configured as a wireless access point (WAP) and an RSSI value of the user devices with respect to the network device 116 can be obtained.

In an aspect, one or more network devices 116 can comprise a respective identifier 118. As an example, one or more identifiers can be or relate to an Internet Protocol (IP) Address IPV4/IPV6 or a media access control address (MAC address) or the like. As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

Figure 2:
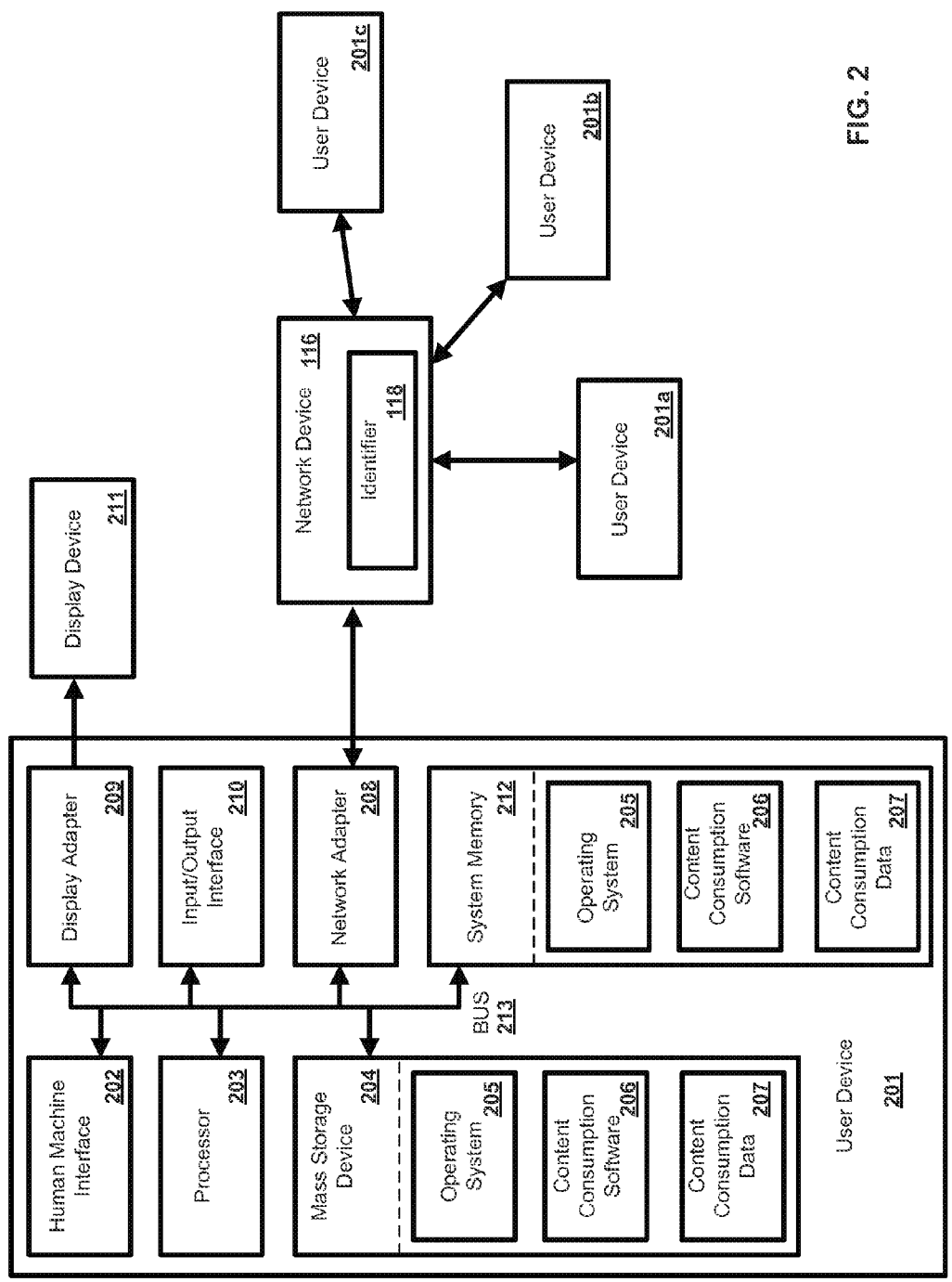
FIG. 2 is a block diagram of an exemplary system and network for content consumption.

In an aspect, the methods and systems can be implemented on a user device 201 as illustrated in FIG. 2 and described below. By way of example, user devices 101, 101a, 101b, 101c and 101d of FIG. 1 can be the user device 201 as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of user devices 201, 201a, 201b and 201c. The components of the user devices 201, 201a, 201b and 201c can comprise, but are not limited to, one or more processor 203, a system memory 212, and a system bus 213 that couples various system components including the processor 203 to the system memory 212. In an aspect, multiple processors can be used and the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, content consumption software 206, content consumption data 207, a network adapter 208, system memory 212, an Input/Output Interface 210, a display adapter 209, a display device 211, and a human machine interface 202, can be contained within one or more user devices 201, 201a, 201b and 201c at physically separate locations, connected through buses of this form, in effect implementing a fully distributed system.

The user devices 201, 201a, 201b and 201c typically comprise a variety of computer readable media. Exemplary readable media can be any available media that is accessible by the user devices 201, 201a, 201b and 201c and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data, such as content consumption data 207, and/or program modules, such as operating system 205 and content consumption software 206, that are immediately accessible to and/or are presently operated on by the processor 203.

In another aspect, the user devices 201, 201a, 201b and 201c can also comprise other removable/non-removable, volatile/non-volatile computer storage media. By way of example, FIG. 2 illustrates a mass storage device 204 that can provide non-volatile storage of computer code, computer readable instructions, data structures, program modules, and other data for the user devices 201, 201a, 201b and 201c. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and content consumption software 206. Each of the operating system 205 and content consumption software 206 (or some combination thereof) can comprise elements of the programming and the content consumption software 206. Content consumption data 207 can also be stored on the mass storage device 204. Content consumption data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the user devices 201, 201a, 201b and 201c via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processor 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the user devices 201, 201a, 201b and 201c can have more than one display adapter 209 and the user device 201 can have more than one display device 211. For example, a display device can be a monitor, an LCD (Liquid Crystal Display), or a projector. In addition to the display device 211, other output peripheral devices can comprise components, such as speakers (not shown) and a printer (not shown), that can be connected to the user devices 201, 201a, 201b and 201c via Input/Output Interface 210. Any step and/or result of the methods can be output in any form to an output device. Such output can be any form of visual representation, including, but not limited to, textual, graphical, animation, audio, tactile, and the like. The display 211 and user devices 201, 201a, 201b and 201c can be part of one device, or separate devices.

The user device 201 can operate in a networked environment using logical connections to one or more user devices 201a, 201b, 201c. By way of example, a user device can be a personal computer, portable computer, smartphone, a server, a router, a network computer, a peer device or other common network node, and so on. Logical connections between the user device 201, 201a, 201b and 201c can be made via a network device 116. Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 205, are illustrated herein as discrete blocks, although it is recognized that such programs and components reside at various times in different storage components of the user devices 201, 201a, 201b and 201c are executed by the data processor(s) of the computer. An implementation of content consumption software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
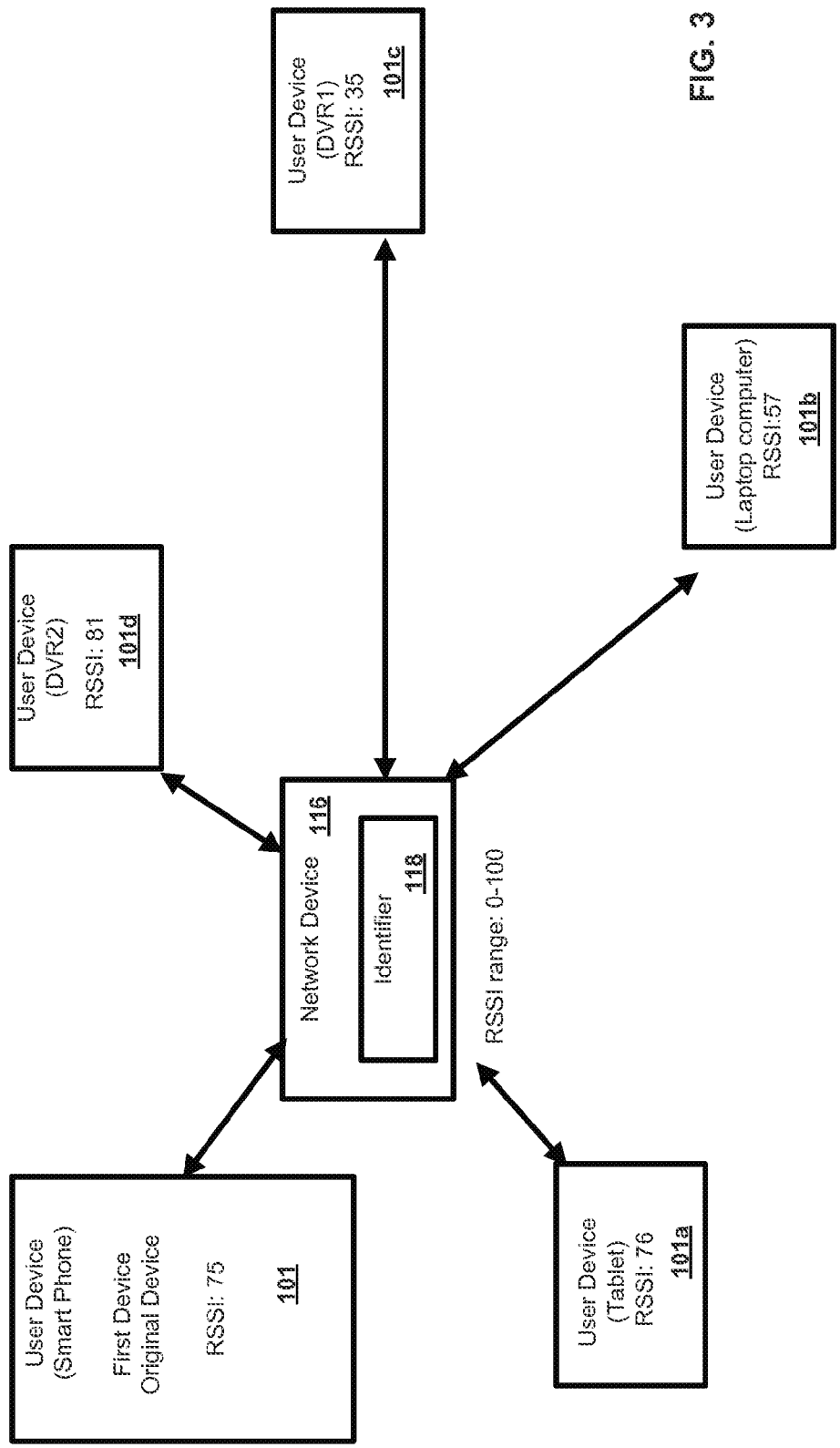
FIG. 3 is a block diagram of an exemplary system environment for content consumption.

FIG. 3 illustrates a block diagram of an exemplary system environment for content consumption. The system can comprise a network device 116 and a plurality of user devices 101, 101a, 101b, 101c and 101d configured to network device 116. In one aspect, network device 116 serves as a wireless base station. For example, network devices 116 can be configured to allow user devices 101, 101a. 101b, 101c and 101d to connect to a wired and/or wireless network using Wi-Fi, Bluetooth or any desired method or standard. All user devices 101, 101a, 101b, 101c and 101d visible to the network device 116 can be considered potential second devices/target devices. Communications between user devices 101, 101a, 101b, 101c and 101d can be routed through network device 116. One or more devices connected to network device 116 can be equipped with a proximity metric processor 120 configured to determine a proximity metric for the user device. The proximity metric of each user device can be compared and thereby used to determine the second device from a plurality of user devices. In an aspect, a proximity metric processor 120 can be implemented in user devices 101, 101a, 101b, 101c and 101d to receive and compare location information of the user devices. For example, the proximity metric processor 120 can comprise a location element 122 that can receive and process location information of the user devices. In an aspect, the location information can be coordinates, such as latitude, longitude, altitude, and the like. The coordinates can be compared to determine the proximity of one user device to another user device. In another aspect, the location information can be the value of a RSSI of a user device within the network. The RSSI value can be compared to determine the proximity of one user device to another user device.

As an example, shown in FIG. 3, a group of user devices connected to network device 116 can each have a RSSI value. A value comparison between the first device and each of the plurality of devices can be made. The device with the least difference in value can be selected as the second device for content consumption. In an aspect, devices can be specifically blocked for content consumption by the user regardless of the difference in RSSI values.

Figure 4:
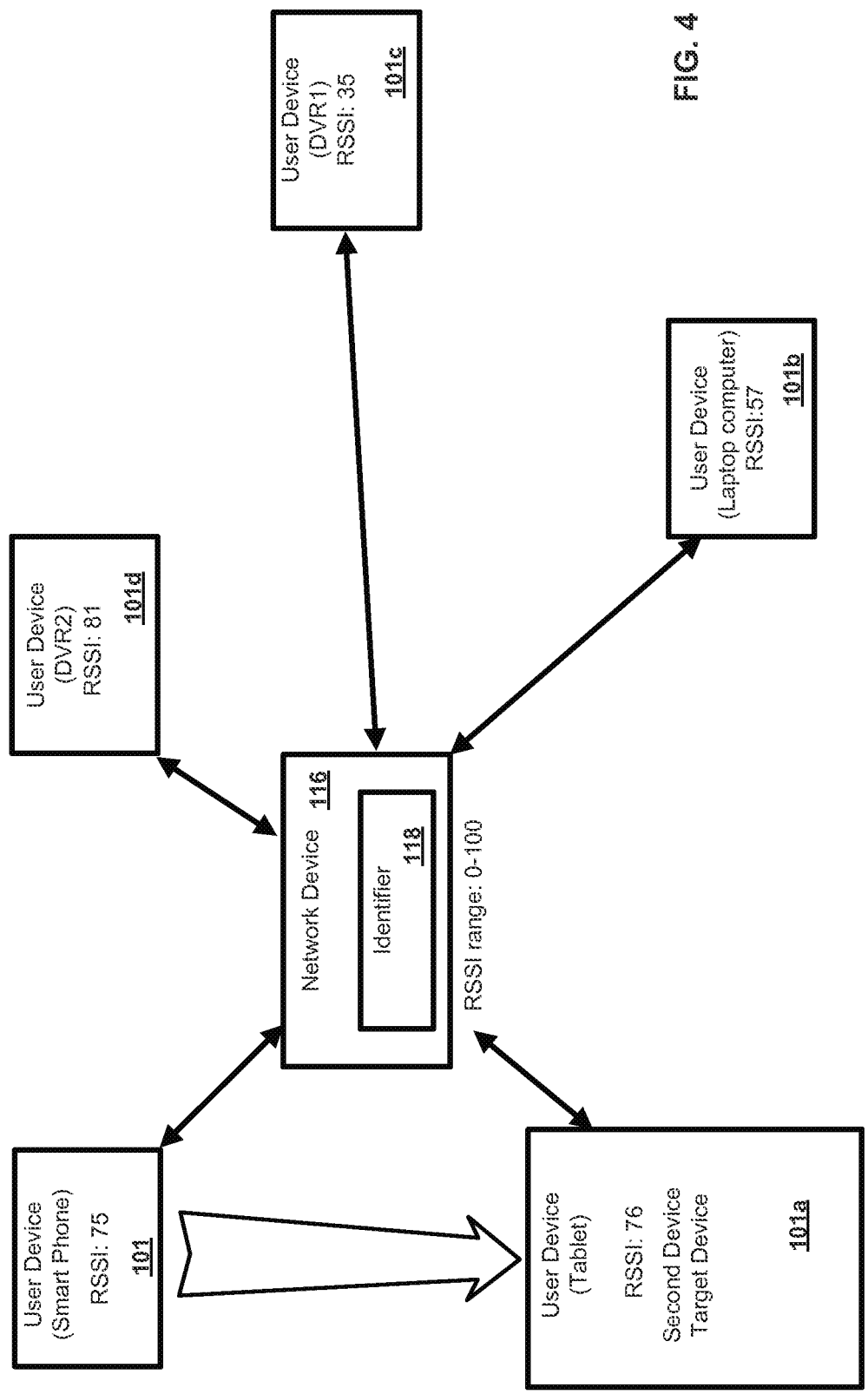
FIG. 4 is a block diagram of an exemplary system environment for content consumption.

FIG. 4 illustrates another block diagram of an exemplary system environment for content consumption. The proximity metric can be any indicator of relative position information, such as RSSI, GPS coordinates or other position information. As an example, the RSSI reading for the first user device 101 is 75, and the RSSI readings for the plurality of user devices are 76 for user device 101a, 57 for user device 101b, 35 for user device 101c and 81 for user device 101d. User device 101a can be identified as having the closest RSSI reading to user device 101, indicating that the user device 101a is the closest one to the first user device 101 and therefore the chosen one for the second device.

Transfer of content consumption can be activated by a user command. Examples of user commands can include multi-touch gestures, mouse clicks and remote control commands. The type of command utilized will be appropriate for the device in use. For example, a multi-touch gesture can be used for a smartphone, tablet or multi-touch trackpad on a desktop computer. A remote control command can be used for a set top box. The devices within the same network can operate on the same or different platforms. For example, content transfer can be transferred from one DVR to another, from a laptop to a tablet, or from a smart phone to a television.

Figure 5:
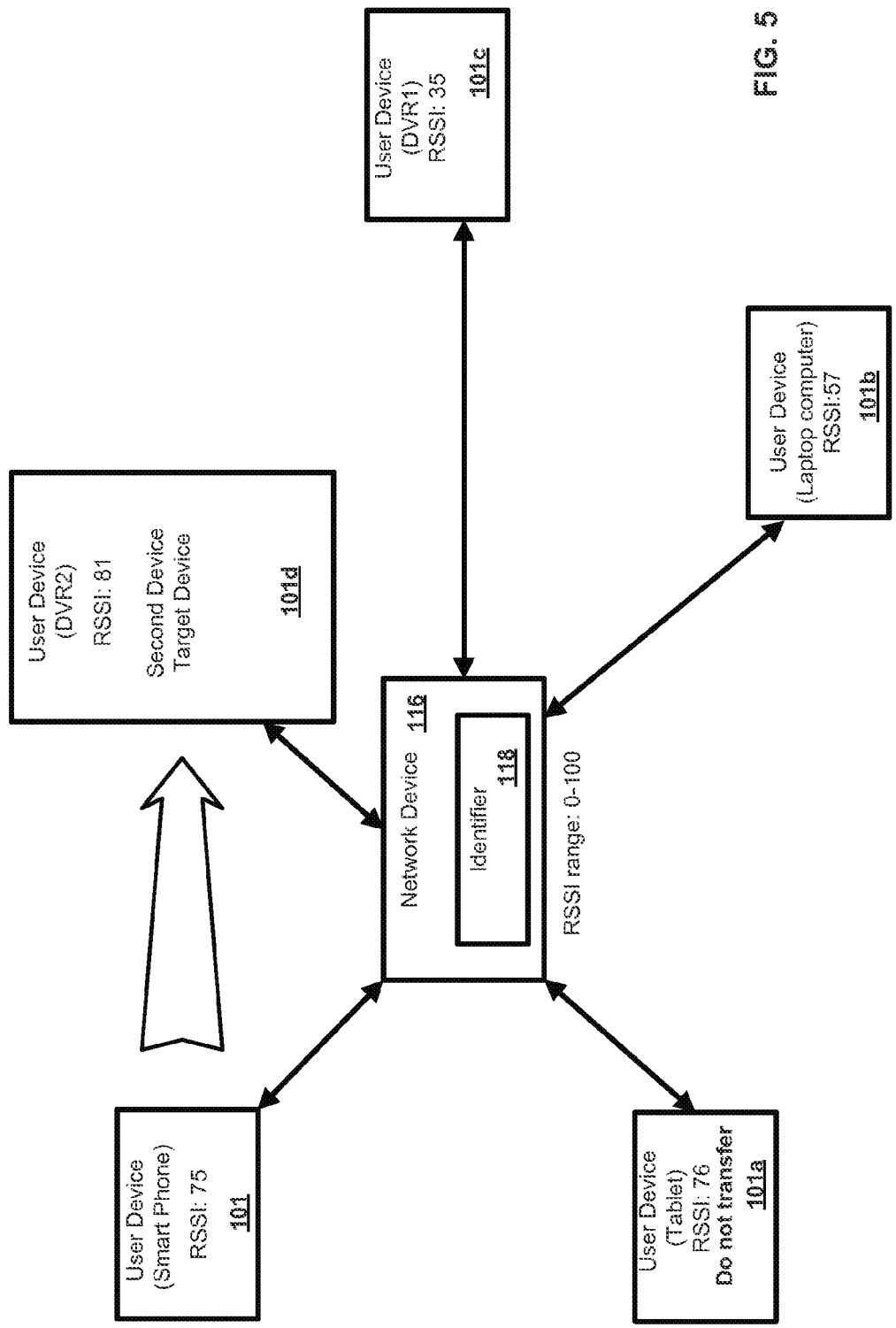
FIG. 5 is a block diagram of an exemplary system environment for content consumption.

In another aspect, the user can designate one or more specific devices as non-transferable. The proximity metric of these devices will be not considered by the system. FIG. 5 illustrates a block diagram of an exemplary system environment for content consumption. In an aspect, when a device in the system has been designated as non-transferable, the non-transferable device and any proximity metrics from the non-transferable device (such as RSSI) can be excluded. For example, assuming that the RSSI readings are the same as in FIG. 4. User device 101a has the closest RSSI reading to the first user device 101. In the present illustration, however, if user device 101a is a non-transferable device, user device 101d will be chosen as the second user device for content consumption. In yet another example, the user can configure the system to exclude direct transfer between certain types of user devices. For example, a user may wish to prevent the transfer of content from a smart phone to a tablet, from a DVR to a smart phone, or from one device to any other device of the same type. In the last case, a certain type of device will not be considered as the second user device, depending on the type of the first user device.

Figure 6:
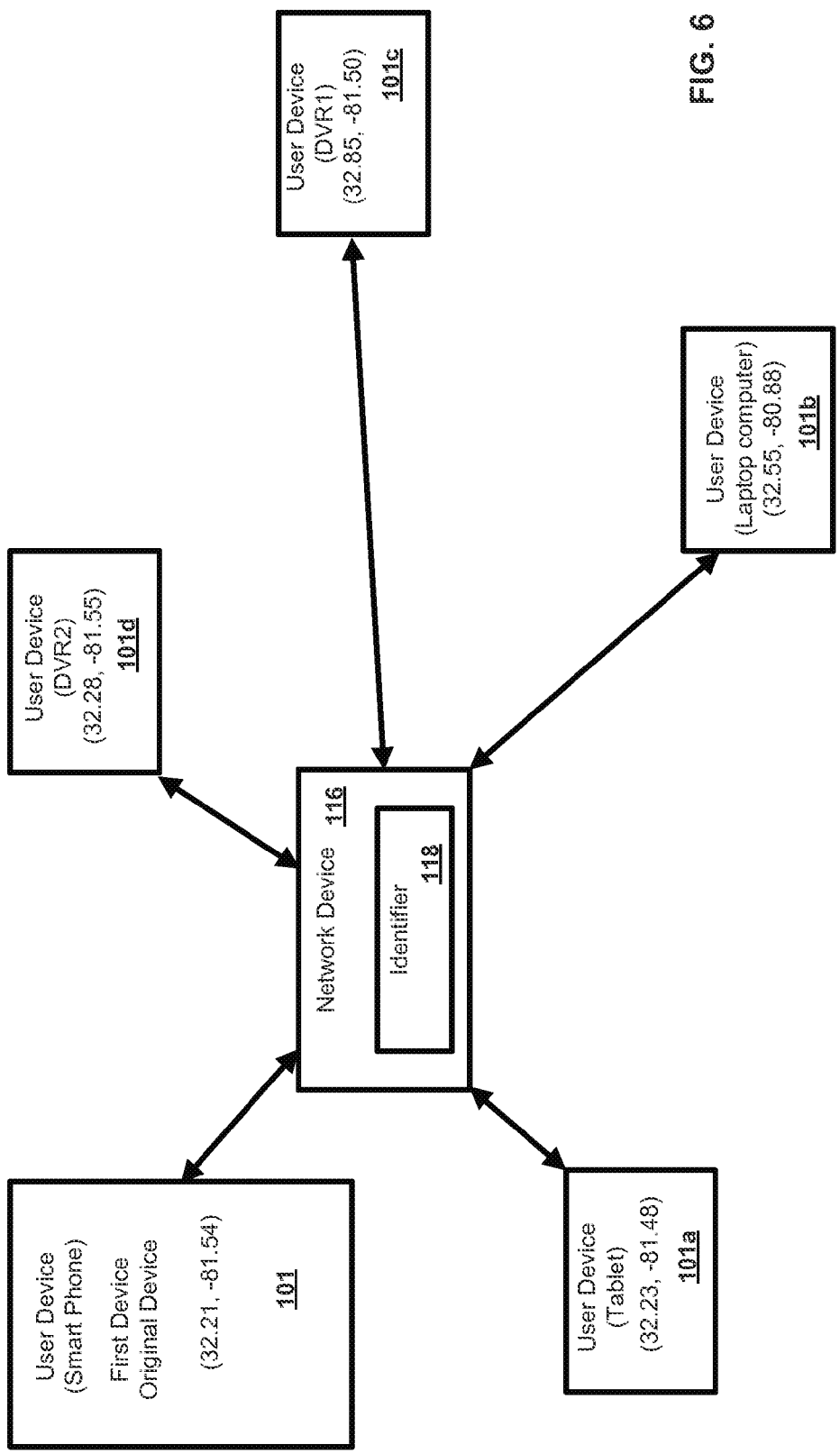
FIG. 6 is a block diagram of an exemplary system environment for content consumption.

FIG. 6 illustrates another block diagram of an exemplary system environment for content consumption. In one aspect, devices connected to the network device 116 can acquire GPS coordinates. For example, location element 122 of the proximity metric processor 120 can collect latitude and longitude of the user device. Elevation and/or altitude information can also be included. The GPS coordinates of the first device and each of the plurality of devices within the network can then be used to determine the second device. Specifically, the user device with closest GPS coordinates to the first user device can be selected as the second device for content consumption.

It should be noted that more than one type of location and/or distance measurement can be used to determine the second device. For example, a combination of RSSI and GPS coordinates can be used for this purpose. Specifically, both RSSI and GPS coordinates can be collected by proximity metric processor 120. The user device with both the closest GPS coordinates and the closest RSSI reading to the first device can be selected as the second device for content consumption. It should also be noted that the present disclosure is not limited thereto and is equally applicable to other location and/or distance measurement techniques as will be readily apparent to those skilled in the art from the description provided herein. For example, orientation information of a user device can be used to facilitate the selection of a second device. As an example, one or more compasses implemented in user devices can be used to determine an orientation of a second device with respect to a first device, or the orientation of a second device with respect to a first device. In an aspect, the orientation information can be combined with location information such as RSSI reading and/or GPS coordinates to determine the closest second device.

Figure 7:
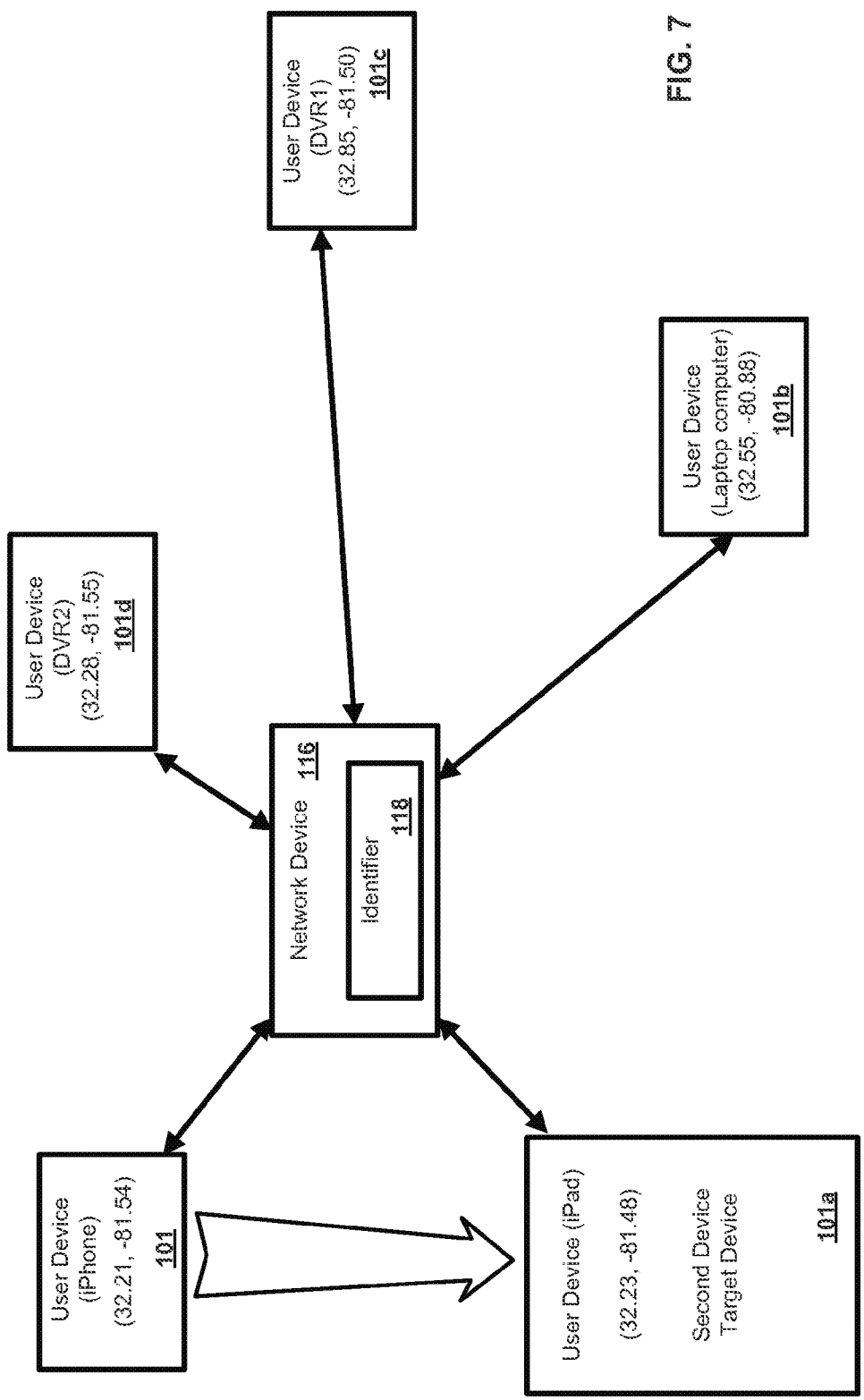
FIG. 7 is a block diagram of an exemplary system environment for content consumption.

FIG. 7 illustrates a block diagram of an exemplary system environment. GPS coordinates are shown for each user device. User device 101a is shown as having the closest GPS coordinates to the first user device 101. User device 101a can therefore be selected as the second user device. In another aspect, the user can designate one or more specific user devices as non-transferable or block certain types of transfer from one device to another. The GPS coordinates of any designated non-transferable user devices can be excluded from consideration in the comparison of proximity metrics.

Figure 8:
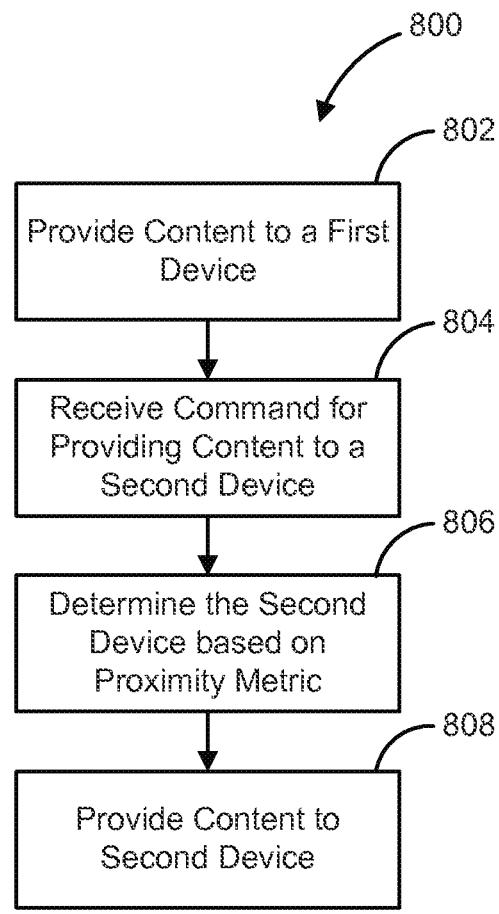
FIG. 8 is a flowchart illustrating an example method for content consumption.

In an aspect, illustrated in FIG. 8, provided is a method 800 by which content can be transferred. At block 802, content can be provided to a first device. For example, content can be delivered from the computing device 104 to the user device 101. As an example, content can comprise a communication session, network access service, video content, audio content, short message, multimedia content, and the like.

At block 804, the first device can receive a content transfer command for providing content to a second device. For example, a content transfer command can be activated on the first device (e.g., user device 101). In an aspect, the content transfer command can comprise a direction associated with the command. As an example, the direction can be specified as from one type of device to another type of device. In one aspect, the content transfer command can designate one or more non-transferable user devices. In another aspect, the content transfer command can exclude direct transfer between certain types of user devices.

At block 806, the second device can be determined from a plurality of devices based on a proximity metric. In an aspect, the proximity metric can be position information, such as RSSI, GPS coordinates, etc. As an example, determining the second device from a plurality of devices based on a proximity metric can comprise determining a RSSI for the first device (e.g., user device 101), determining a RSSI for each of the plurality of devices (e.g., user devices 101a, 101b, 101c, 101d), determining which device of the plurality of devices has a RSSI with the least difference from the RSSI for the first device (e.g., user device 101), and identifying the device of the plurality of devices with the least difference from the RSSI from the first device as the second device. As another example, determining the second device from a plurality of devices based on a proximity metric can comprise determining a GPS location for the first device (e.g., user device 101), determining a GPS location for each of the plurality of devices (e.g., user devices 101*a*, 101*b*, 101*c*, 101*d*), determining which device of the plurality of devices has a GPS location closest to the GPS location for the first device, and identifying the device of the plurality of devices closest to the first device as the second device.

As an example, the proximity metric processor 120 of the first device 101 can collect the proximity metrics (e.g., RSSI value, GPS coordinates) of the user devices 101, 101*a*, 101*b*, 101*c* and 101*d*. The proximity metrics of the user devices 101, 101*a*, 101*b*, 101*c* and 101*d* can be communicated through the network device 116. The proximity metric of the first user device (e.g., user device 101) and the proximity metrics of the plurality of other user devices (e.g., 101*a*, 101*b*, 101*c*, 101*d*) on the network can be compared in the proximity metric processor 120 of the first device (e.g., user device 101). The user device with the closest proximity metric to the first device can be selected as the second device for content consumption.

In an aspect, if the content transfer command at block 804 indicates a non-transferable device, the proximity metric of the non-transferable device can be excluded. In another aspect, the content transfer command at block 804 can exclude direct transfer between certain types of user devices. In this case, the proximity metrics of certain types of devices can be excluded. In another aspect, the content type being provided to the first device can be determined and certain devices can be excluded from consideration as the second device based on the content type. For example, a television may not be able to display a content provided to an IP-enabled mobile device. If the first device is an IP-enabled mobile device, and the content type is an IP video stream, based on the content type provided to the first device, a television can be excluded from consideration as the second device.

At block 808, content can be provided to the selected second device, for example, user device 101*a*, 101*b*, 101*c* or 101*d*. In an aspect, the network device 116 can be informed of the choice of second device by its device identifier 108 or address element 110 and direct the content to the selected second device. As an example, content such as a communication session, network access service, video content, audio content, short message, multimedia content being provided to the first device at block 802 can be provided to the selected second device.

Figure 9:
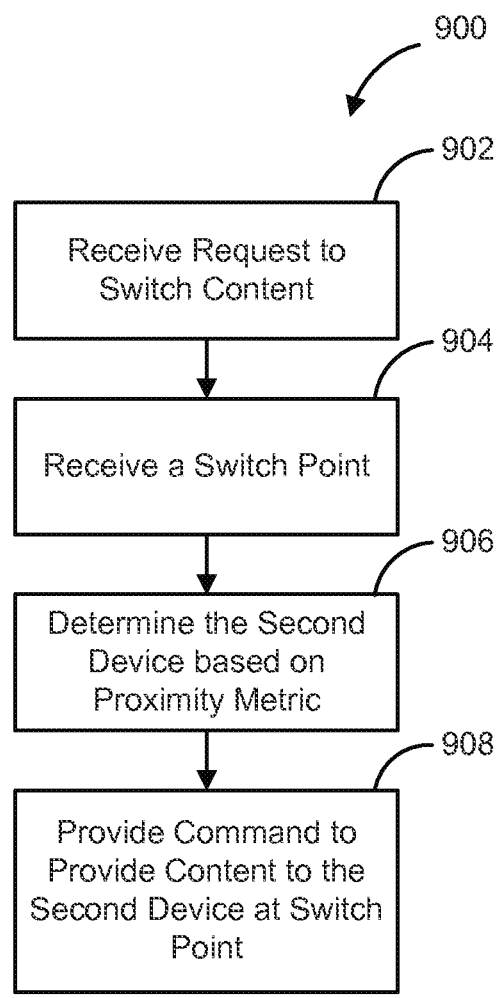
FIG. 9 is a flowchart illustrating another example method for content consumption.

In another aspect, illustrated in FIG. 9, provided is a method 900 by which content can be transferred. At block 902, a request can be received to switch content from being delivered to a first device to being delivered to a second device. For example, a content transfer request can be received on the first device (e.g., user device 101). In an aspect, the request to switch content can comprise a direction associated with the request. As an example, the direction can be specified as from one type of device to another type of device. In one aspect, the content transfer request can designate one or more non-transferable user devices. In another aspect, the content transfer request can exclude direct transfer between certain types of user devices.

At block 904, a switch point can be received. A switch point can be a moment in time when the content being provided to a first device should begin being provided to the second device. For example, a switch point can be X minutes from the time of receiving the content transfer request. As another example, a switch point can be a specific time.

At block 906, the second device can be determined based on a proximity metric. The proximity metric can be position information, such as RSSI, GPS coordinates, etc. As an example, determining the second device from a plurality of devices based on a proximity metric can comprise determining a RSSI for the first device (e.g., user device 101), determining a RSSI for each of the plurality of devices (e.g., user devices 101*a*, 101*b*, 101*c*, 101*d*), determining which device of the plurality of devices has a RSSI with the least difference from the RSSI for the first device (e.g., user device 101), and identifying the device of the plurality of devices with the least difference from the RSSI from the first device as the second device. As another example, determining the second device from a plurality of devices based on a proximity metric can comprise determining a GPS location for the first device (e.g., user device 101), determining a GPS location for each of the plurality of devices (e.g., user devices 101*a*, 101*b*, 101*c*, 101*d*), determining which device of the plurality of devices has a GPS location closest to the GPS location for the first device, and identifying the device of the plurality of devices closest to the first device as the second device.

As an example, the proximity metric processor 120 of the first device 101 can collect the proximity metrics of the user devices 101, 101*a*, 101*b*, 101*c* and 101*d*. The proximity metrics of the user devices 101, 101*a*, 101*b*, 101*c* and 101*d* can be communicated through the network device 116. The proximity metric of the first user device (e.g., user device 101) and the proximity metrics of the plurality of other user devices (e.g., 101*a*, 101*b*, 101*c*, 101*d*) on the network can be compared in the proximity metric processor 120 of the first device (e.g., user device 101). The device with the closest proximity metric to the first device (e.g., user device 101) can be selected as the second device for content consumption.

In an aspect, determining the second device can comprise excluding a device from the plurality of devices from consideration as the second device based on the direction associated with the request received at block 902. For example, if the content transfer request at block 902 indicates a non-transferable device, the proximity metric of the non-transferable device can be excluded. In another aspect, the content transfer request at block 902 can exclude direct transfer between certain types of user devices. In this case, the proximity metric of certain types of devices can be excluded. In another aspect, the content type being provided to the first device can be determined and certain devices can be excluded from consideration as the second device based on the content type. For example, a television may not be able to display a content provided to an IP-enabled mobile device. If the first device is an IP-enabled mobile device, and the content type is an IP video stream, based on the content type provided to the first device, a television can be excluded from consideration as the second device.

At block 908, a command can be provided to provide content to the second device at the switch point. For example, the network device 116 can be informed of the choice of second device by its device identifier 108 or address element 110 and direct the content to the second device at the designated switch point (e.g., X minutes from the time of receiving the request at block 902). The network device 116 can be informed of the choice of second device by its device identifier 108 or address element 110 and direct the content to the second device at a specific time.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   transmitting at least a first portion of content to a first device;
   receiving a command to transmit the content to another device;
   determining a received signal strength indicator (RSSI) for the first device;
   determining a RSSI for each of a plurality of devices, the plurality of devices comprising at least one transferable device and at least one non-transferable device;
   determining, from the plurality of devices, a second device having a RSSI with a least difference from the RSSI of the first device;
   determining, based a determination that the second device is a transferable device, the second device as the another device;
   and
   transmitting at least a second portion of the content to the second device.

2. The method of claim 1, wherein determining the second device as the another device comprises determining the second device as the another device based on GPS coordinates.

3. The method of claim 2, wherein determining the second device as the another device based on the GPS coordinates comprises:
   determining a GPS location for the first device;
   determining a GPS location for each of the plurality of devices;
   determining which device of the plurality of devices has a GPS location closest to the GPS location for the first device; and
   identifying the device of the plurality of devices closest to the first device as the second device.

4. The method of claim 1, wherein the at least one non-transferable device is designated as non-transferable based on a user designation.

5. The method of claim 1, wherein the command to transmit the content to the another device comprises a direction associated with the command, and wherein the at least one non-transferable device is designated as non-transferable based on the direction associated with the command.

6. The method of claim 1, wherein the at least one non-transferable device is designated as non-transferable based on a type of the first device.

7. The method of claim 1, wherein the at least one non-transferable device is designated as non-transferable based on a type of the second device.

8. A method comprising:
   receiving a request to switch content from being delivered to a first device to being delivered to another device;
   receiving a switch point;
   determining a RSSI for the first device;
   determining a RSSI for each of a plurality of devices comprising at least one transferable device and at least one non-transferable device;
   determining a second device from the plurality of devices having a RSSI with a least difference from the RSSI of the first device;
   determining, based on a determination that the second device is a transferable device, the second device as the another device;
   and
   causing the content to be delivered to the second device at the switch point.

9. The method of claim 8, wherein the switch point indicates a point in time in the content being delivered at which the content should begin to be delivered to the second device.

10. The method of claim 8, wherein determining the second device as the another device comprises determining the second device as the another device based on GPS coordinates.

11. The method of claim 10, wherein determining the second device as the another device based on GPS coordinates comprises:
    determining a GPS location for the first device;
    determining a GPS location for each of the plurality of devices;
    determining which device of the plurality of devices has a GPS location closest to the GPS location for the first device; and
    determining the device of the plurality of devices closest to the first device as the second device.

12. The method of claim 8, wherein the at least one non-transferable device is designated as non-transferable based on a user designation.

13. The method of claim 8, wherein the request to switch content comprises a direction associated with the request, and wherein the at least one non-transferable device is designated as non-transferable based on the direction associated with the request.

14. The method of claim 8, wherein the at least one non-transferable device is designated as non-transferable based on a type of the first device.

15. The method of claim 8, wherein the at least one non-transferable device is designated as non-transferable based on a type of the second device.

16. An apparatus comprising:
    one or more processors; and
    a memory comprising processor executable instructions that, when executed by the one or more processors, cause the apparatus to:

receive a request to switch content from being delivered to a first device to being delivered to another device;

determine a content type of the content;

receive a switch point;

determine a RSSI for the first device;

determine a RSSI for each of a plurality of devices comprising at least one transferable device and at least one device non-transferable device;

determine a second device from the plurality of devices having a RSSI with a least difference from the RSSI for the first device;

determine, based on the content type and a determination that the second device is a transferable device, the second device as the another device;

and cause the content to be delivered to the second device at the switch point.

17. The apparatus of claim 16, wherein the processor executable instructions that, when executed by the one or more processors, cause the apparatus to determine the second device as the another device comprise processor executable instructions that, when executed by the one or more processors, cause the apparatus to determine the second device as the another device based on GPS coordinates.

18. The apparatus of claim 17, wherein the processor executable instructions that, when executed by the one or more processors, cause the apparatus to determine the second device as the another device based on GPS coordinates comprise processor executable instructions that, when executed by the one or more processors, cause the apparatus to:

determine a GPS location for the first device;

determine a GPS location for each of the plurality of devices;

determine which device of the plurality of devices has a GPS location closest to the GPS location for the first device; and determine the device of the plurality of devices closest to the first device as the second device.

19. The apparatus of claim 16, wherein the at least one non-transferable device is designated as non-transferable based on a type of the first device.

20. The apparatus of claim 16, wherein the at least one non-transferable device is designated as non-transferable based on a type of the second device.

* * * * *